Nov. 28, 1933.  H. B. HAINES  1,936,938
TRACTOR TRUCK FOR POWER SHOVELS
Filed April 30, 1931  3 Sheets-Sheet 1

Witness:
Chas. R. Koursh

Inventor
Homer B. Haines,
Offield Middhope Pratt Poole Attys.

Nov. 28, 1933.     H. B. HAINES     1,936,938
TRACTOR TRUCK FOR POWER SHOVELS
Filed April 30, 1931     3 Sheets-Sheet 2

Witness:
Chas. R. Koursh

Inventor,
Homer B. Haines

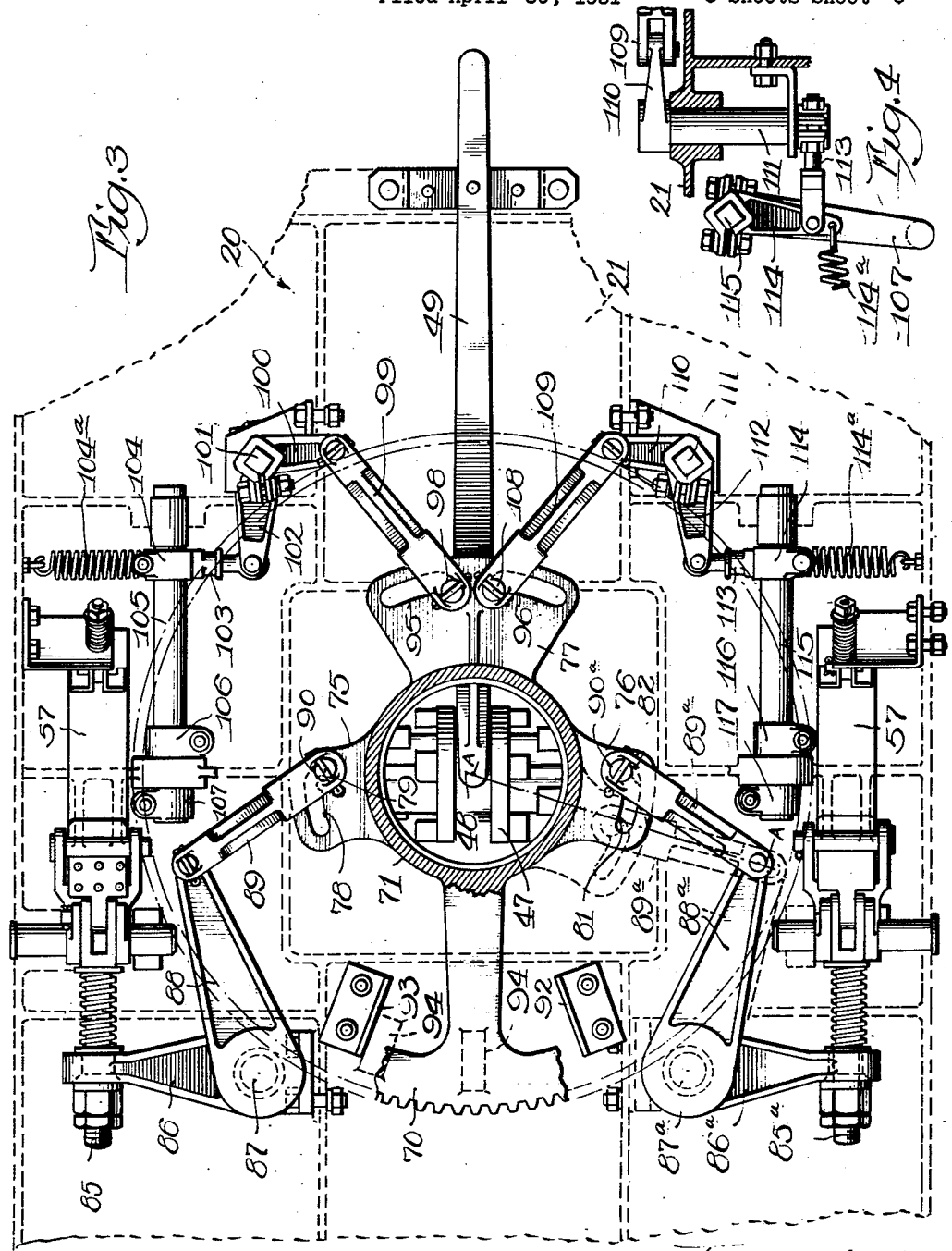

Patented Nov. 28, 1933

1,936,938

UNITED STATES PATENT OFFICE 1,936,938

TRACTOR TRUCK FOR POWER SHOVELS

Homer B. Haines, Lima, Ohio, assignor to The Ohio Power Shovel Company, Lima, Ohio, a corporation of Ohio Application April 30, 1931. Serial No. 534,123

2 Claims. (Cl. 180—9.2)

This invention relates to improvements in continuous tread trucks especially adapted for power shovels, cranes or similar mechanisms rotatably mounted thereon, although not restricted to such use.

Among the objects of the present invention is to provide an improved form of steering mechanism adapted for tread mechanisms of the character described. A further object is to provide an improved and simplified change speed transmission for such machines. A further object is to provide an improved chain drive connection. These and other features of invention will appear from time to time as the following description proceeds.

Like numerals apply to similar parts throughout the several figures on the drawings.

The invention may best be understood by reference to the accompanying drawings, in which Figure 1 is a plan view of a truck constructed in accordance with my invention, with the superstructure and turntable removed to show parts of the steering and driving mechanism to which my invention relates.

Figure 3 is an enlarged detail view taken from above the truck, with parts of the turntable support broken away to show details of the steering control mechanism.

Figure 4 is a detail view of the steering clutch operating mechanism.

Figure 2:
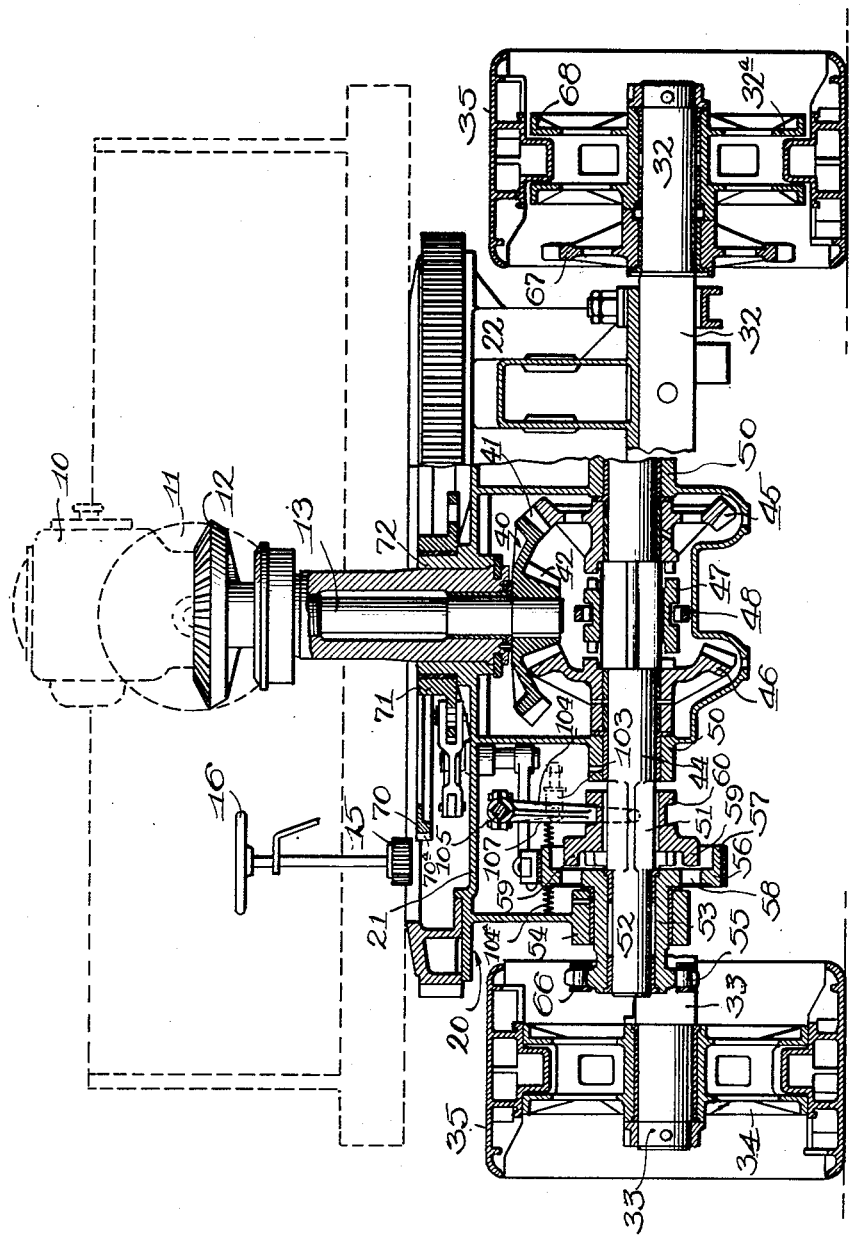
Figure 2 is a transverse sectional view taken on line 2—2 of Figure 1, and showing the superimposed turntable member of a power shovel, crane or the like in dotted lines.

Referring now to details shown in the drawings, it will be seen in Figure 2 that the parts of the truck body are shown in full lines, while a suitable turntable such as may be mounted thereon is indicated in dotted lines. The specific type of mechanism to be carried on the turntable need not be illustrated and described in detail, excepting to note that a power device such as a motor indicated at 10 is connected through gear 11 to a bevel pinion 12 on shaft 13 disposed coaxially of the turntable, and from which shaft power is transmitted to the tread mechanism as will hereinafter more fully appear.

Drive controlling pinion 15 and hand wheel 16 associated therewith are also carried on the turntable in position to be cooperatively connected with the steering devices on the truck body in any position of rotation of the turntable, as will also more fully appear. It will be understood, however, that the forms and types of turntables or other mechanisms to be mounted on the truck body, may vary widely from the form herein indicated.

Referring more particularly to the truck, the same includes a main frame 20 preferably in the form of an integral casting, and having an annular platform 21 surmounting two longitudinally disposed side frame members 22, 22 extending from opposite ends thereof. The beams 22, 22 are preferably made hollow to provide the desired strength and rigidity.

Connected along the lower surface of the side beams 22 are provided two end axles 31, 32 carrying tread sprocket wheels 31ª, 32ª, and a plurality of intermediate through axles 33, 33 which carry tread supporting wheels 34 forming idler bearings for the upper and lower flights of the continuous treads 35, 35.

Figure 1:
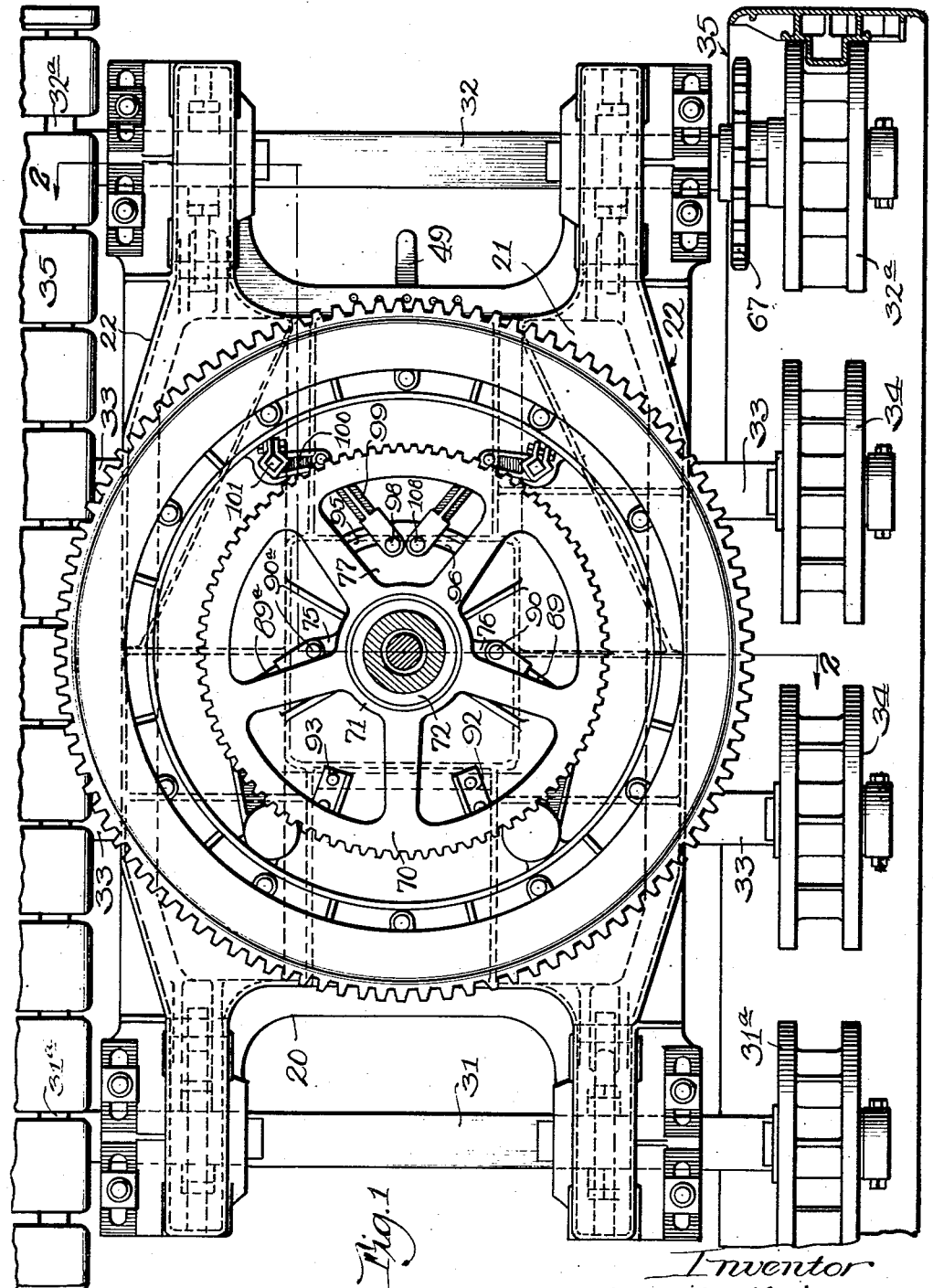

Referring now to the driving connections for the continuous treads it will be understood that power is transmitted through bevel pinion 12 on the upper end of vertically disposed shaft 13, as already described. A double pinion 40 having a larger wheel 41 and a smaller wheel 42 is mounted on the lower end of shaft 13, below the platform 21. A transverse shaft 44 is mounted centrally of the truck frame and has two bevel gears 45 and 46 loosely mounted thereon in spaced relation, the gear 45 being meshed with the larger pinion 41 on the center shaft 13, and the gear 46 being meshed with the smaller pinion 42. A sliding clutch member 47 is feathered on the transverse shaft 44 between gears 45 and 46 so as to be selectively connected to one or the other, to drive the transverse shaft 44 at two different speeds and in different directions. The clutch member 47 is shifted by yoke 48 having a handle 49 extending toward one end of the truck frame in position to be readily manipulated, as seen in Figures 1 and 3.

The transverse shaft extends through depending bearings 50, 50 rigid with the platform 21. On each end of the transverse shaft beyond the adjacent bearing 50 is a squared portion 51 and a reduced end portion 52. A sleeve or quill 53 is loosely mounted on the reduced portion 52 and also has bearing in a journal 54 rigid with the platform. A chain sprocket 55 is carried on the outer end of the quill 53 and preferably integral therewith as shown. The inner end of said quill has a drum 56 carried thereby, the outer periphery of which is engaged by a friction band 57 forming part of the steering and control mechanism. The drum 56 also has a plurality of apertures 58, 58 formed therein which are adapted to be engaged by clutch teeth 59, 59 on a clutch member 60, which is slidably mounted on the squared portion 51 of the transverse shaft.

It will be understood that the drive clutch and braking mechanism above described as applied to one end of the transverse shaft 44 is duplicated on the opposite end of said shaft, and that the two sets of clutch and brake devices on the drive sprocket quills 53, 53 are arranged to be selectively operated for driving and steering the machine through the final medium of drive chains 66, 66 connected to sprockets 67, 67 rigid with tread driving wheels 32ª, 32ª on axle 32 at one end of the truck. The drive chains 66, 66, of course, pass above and below the intermediate axle 33 between their drive sprockets 55 and 67.

Referring now to the control means for the brake and clutch devices above described, I provide a control wheel 70 having a hub 71 loosely mounted on the upstanding center journal 72 of the truck platform 21. Integral with the hub 71 below the wheel 70 are a pair of oppositely disposed plates 75 and 76 extending horizontally from the sides of the hub, and a centrally disposed plate 77 extending toward one end of the machine as is best shown in Figure 3. The plate 75 has a curved slot 78 in its outer end, the major portion of which is concentric with the axis of the control wheel 70, but having an inwardly curved portion 79 at one end as shown. The oppositely disposed plate 76 has a similarly shaped slot 81 formed therein, but arranged with its inwardly curved end portions 82 extending in the same direction as the inwardly curved end portion 79 of the companion slot 78.

The upper brake band 57 as seen in Figure 3, is operatively connected to control wheel 70 through a brake rod 85, lever arm 86, vertical shaft 87, lever arm 88 and link 89 to a pin 90 which is slidably in the curved slot 78 of plate 75. A similar operative connection between the lower friction band 57 and plate 76 comprises a connecting rod 85ª, lever arm 86ª, upright shaft 87ª, lever arm 88ª and link 89ª connected to pin 90ª slidable in curved slot 81 of plate 76.

It will be observed that the control connections for either of the brake bands 57 may be positively locked so as to maintain one or the other of said brake bands in frictional engagement. This is accomplished by rotating the control wheel 70 into extreme position as indicated in dotted lines in Figure 3, in which case the pin 90ª passes over a dead center line A—A determined by the point of pivotal connection between the lever 88ª and the link 89ª and the axis of wheel 70. In this position the lower brake band 57 will be maintained in locked position until the toggle connection is unlocked by positively rotating the control wheel 70 in a counter-clockwise direction.

The opposite brake band 57 can, of course, be locked in a similar manner by rotating the control wheel 70 to its extreme counter-clockwise position.

A pair of stops 92, 93 are provided on opposite sides of a lug 94 on the under face of the control wheel 70 so as to limit the rotation of said control wheel.

The sliding clutches 60, 60 which connect the transverse shaft 44 with the two drive sprocket quills 53, 53 at opposite sides of the frame are provided with a somewhat similar slotted operated connection with the control wheel 70, as will now be described.

The plate 77 is provided with two slots 95, 96 substantially concentric with the axis of the control wheel. The slot 95 has a pin 98 slidable therein and connected by link 99 to lever arm 100 and upright shaft 101. A lever arm 102 is mounted on the lower end of shaft 101 and is pivotally connected by link 103 to a depending lever 104 on horizontal shaft 105 (see Fig. 4). A pair of depending arms 106 and 107 are mounted on the end of shaft 105 and together form a shifting yoke for the sliding clutch member 60 (as shown in Figure 2). A spring 104ª is connected between the lower end of lever 104 and a fixed portion of the main frame, which spring normally tends to throw the clutch teeth 59 of clutch member 60 into driving engagement with the drive sprocket quill 53. When the plate 77 is in the central or neutral position shown in full lines in Figure 3, both clutch members 60, 60 are engaged with their respective drive sprocket quills 53, so that both treads will be driven. The tension of the spring 104ª acting through the intermediate connecting members also tends to urge the pin 98 on link 99 toward the inner end of the slot 95.

A similar operative connection is provided for the clutch member 60 on the opposite side of the machine, which connection comprises a pin 108, link 109, lever arm 110, upright shaft 111, lever arm 112, link 113, lever arm 114, shaft 115 and shifting yoke members 116 and 117. A spring 114ª is also provided corresponding to spring 104ª previously described.

When the control wheel 70 is rotated in a clockwise direction clutch member 60 at the lower side of the machine, as seen in Figure 3, will be moved out of driving engagement with its associated drive sprocket quill 53. During such movement, the pin 108 is positively rotated with the wheel 70, but the tension of spring 104ª on shaft 105 holds the opposite pin 98 stationary and the latter slides along slot 95 so that the upper clutch 60 remains engaged.

It will now be understood that the control wheel 70 may be operated by the drive controlling pinion 15 and hand wheel 16 on the turntable in any position of rotation of said turntable by moving said pinion into engagement with the toothed periphery 70ª of said control wheel. The operation is such that when the control wheel is in central or neutral position, both clutches 60, 60 are engaged with their respective drive sprocket quills 53, 53, and both treads will be driven from shaft 44 at either high or low speed, depending upon which drive gear, 45 or 46, is clutched to said shaft. Partial rotation of the control wheel in one direction will first disengage one of the clutch members 60 so as to form a driving connection for the opposite tread only, in which case the tractor will turn upon a relatively large radius due to the fact that only one of the treads is driven. Further rotation of the control wheel will bring the brake band 57 into effective frictional engagement with the chain driven sprocket quill which is at that instant disengaged from driving connection, so as to retard movement of the undriven tread, and as a result decreases the radius of movement of the machine, depending upon the amount of braking resistance applied to said undriven sprocket and the tread connected therewith. Still further rotation of the control wheel to its extreme position will serve to lock the brake, owing to the toggle locking action of links 88, 89 or 88ª, 89ª as previously described, and the brake will be maintained in this locked position without further attention from the operator until the control wheel is positively rotated in the opposite direction so as to break the toggle lock.

This positive locking arrangement is particularly advantageous in maintaining the truck stationary during digging operations, since the operator has only to "set" the brake lock on one of the treads and pay no more attention to it until he has to move to a new position.

Among other advantageous features of the structure disclosed is the provision of the intermediate axles 33 which extend the width of the frame, and carry the tread supporting wheels 34, 34 at opposite ends thereof. This structure gives an especially rigid and strong supporting base wherein the entire frame rests upon the end and intermediate axles, which in turn provide direct cross-support between the two treads.

Although I have illustrated and described one particular embodiment of my invention, it will be understood that I do not wish to be limited to the exact construction shown and described, but that various changes and modifications may be made without departing from the spirit and scope of my invention.

I claim:

1. In a continuous tread truck, a frame, a turntable mounted thereon, power means carried by said turntable, an axially disposed vertical shaft connected with said power devices, a pair of continuous tread devices supporting said truck, and power connections between said vertical shaft and said tread devices including a pair of drive members operatively connected to said treads, clutches affording selective driving connections for said drive members, brake means for each of said drive members, and controlling means for said clutches and brakes comprising a rotatable wheel mounted on said frame concentric with said turntable, means on said turntable for operatively engaging said wheel in any position of rotation of said turntable, pin and slot connections for said clutches and brakes mounted on said wheel arranged to selectively disengage one of said clutches by partial rotation of said wheel, and thereafter apply its associated brake by further rotation of said wheel, said brake operating connections, each including a toggle member movable into self-locking position by rotation of said wheel into a further position.

2. In a continuous tread truck, a frame, a turntable mounted thereon, power means carried by said turntable, an axially disposed vertical shaft connected with said power devices, a pair of continuous tread devices supporting said truck, and power connections between said vertical shaft and said tread devices including a transverse shaft, a pair of drive members at opposite ends of said transverse shaft operatively connected to said treads, clutches on said transverse shaft affording selective driving connections for said drive members, tension means normally maintaining both of said clutches in engaged position, brake means for each of said drive members, and controlling means for said clutches and brakes comprising a rotatable wheel mounted on said frame concentric with said turntable, means on said turntable for operatively engaging said wheel in any position of rotation of said turntable, pin and slot connections for said clutches and brakes mounted on said wheel arranged to selectively disengage one of said clutches by partial rotation of said wheel, and thereafter apply its associated brake by further rotation of said wheel, said brake operating connections each including a toggle member movable into self-locking position by rotation of said wheel into a further position.

HOMER B. HAINES.